Oct. 9, 1945.  H. H. HILE  2,386,463
RESILIENT MOUNTING
Filed Nov. 6, 1943
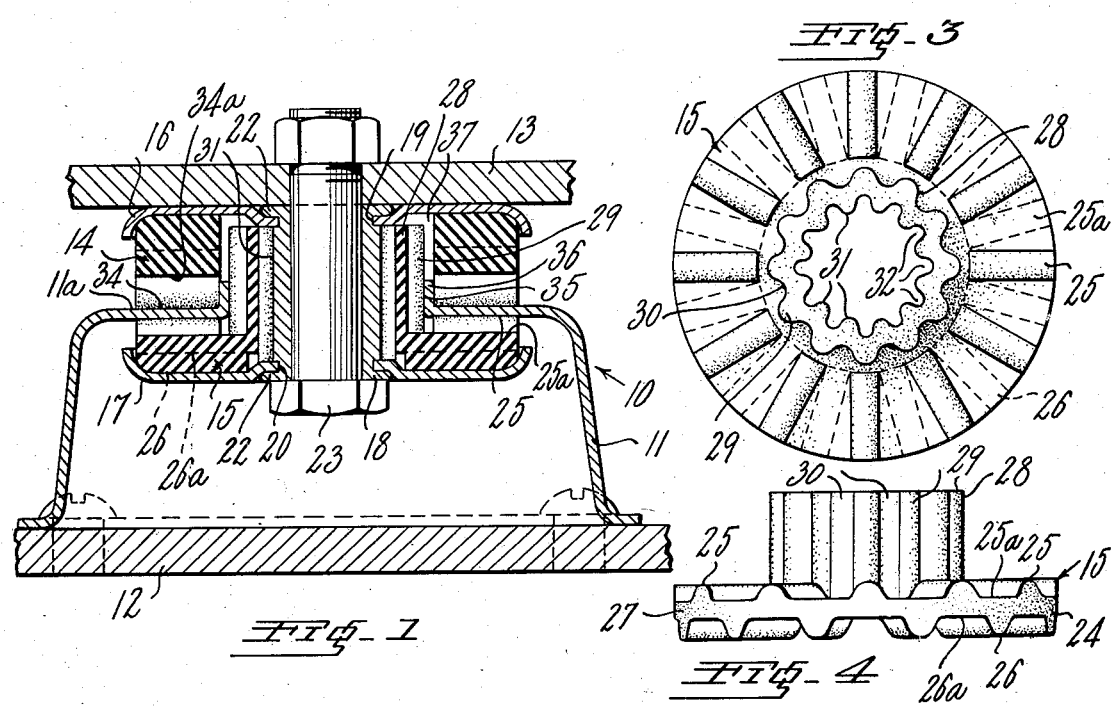
INVENTOR.
HESTON H. HILE
BY Lester J. Bradbury
ATTORNEY Patented Oct. 9, 1945

2,386,463

UNITED STATES PATENT OFFICE 2,386,463

RESILIENT MOUNTING

Heston H. Hile, Riverside, Conn., assignor to United States Rubber Company, New York, N. Y., a corporation of New Jersey Application November 6, 1943, Serial No. 509,157

9 Claims. (Cl. 248—358)

This invention relates to an improved resilient mounting adapted to damp the relative vibratory movements between two connected members. The invention relates particularly to a mounting having a soft resilient member made of a soft resilient material, such as soft resilient rubber composition, directly interposed between the load applying member and the load receiving member and adapted to damp the relative vibratory movements between such members by virtue of the flexure of the resilient member between projections located on its opposite sides and staggered on one side in respect to the other.

Heretofore soft resilient rubber composition has been placed in direct compression between two members for the purpose of damping the relative vibrations that may be set up therebetween. Rubber under compression has a relatively high natural frequency of vibration and does not damp the vibrations as efficiently as the lower natural frequency of vibration obtained by subjecting the resilient member to flexure.

In accordance with this invention the efficient lower natural frequency of vibration of the rubber when subjected to flexure is utilized to damp the vibrations in the normal vibratory range, and higher frequency of the rubber when subjected to compression is utilized to damp the vibrations beyond the normal range.

By the use of the construction embodying this invention an efficient, dependable, and economical vibration damping mounting is obtained.

The invention is further described in reference to the accompanying drawing, in which:

Fig. 1 is a cross-sectional view of a resilient mounting embodying this invention, and showing its connection between the supporting and the supported member;

Fig. 2 is a plan view of the mounting shown in Fig. 1 with the supported member removed;

Fig. 3 is a plan view of the lower resilient vibration damping member shown in Fig. 1;

Fig. 4 is an elevational view of the member shown in Fig. 3;

Fig. 5 is a plan view of the upper resilient vibration damping member shown in Fig. 1; and Fig. 6 is a cross-sectional view of the resilient member shown in Fig. 5 taken on line 6—6.

In the embodiment of the invention shown in the drawing, the mounting 10 has a cup-shaped load receiving base 11, which is supported on and may form a part of a supporting member 12. The mounting is adapted to support an object 13, which may vibrate in all directions in respect to the supporting member 12.

The vibrations of the object 13 are damped by soft resilient ring, or disc shaped members 14 and 15, which are clamped to the base 11 between an upper rigid disc-shaped plate 16 and a lower rigid disc-shaped plate 17 by means of a rivet 18 extending through aligned openings 19 and 20 in the respective plates. As shown in Fig. 1, the rims of the openings 19 and 20 interfit with shouldered recesses on the ends 22 of the rivet 18, which are formed by beading the ends 22 of the rivet over the rims to retain the plates 16 and 17 in place. It will be understood that a bolt or any other equivalent holding member may be employed to hold the plates in spaced relation to each other with the resilient members 14 and 15 clamped therebetween on either side of the top 11a of the base 11. However, for convenience, a hollow rivet is employed so that a bolt 23 may be extended through the rivet to secure the supported object 13 to the mounting.

The resilient damping members 14 and 15 are made of a soft resilient material, such as a soft resilient rubber composition. Referring to Figs. 3 and 4, the lower resilient ring 15 is provided with a disc-like portion 24 having projections or radial ridges 25 extending from its upper surface, and similar ridges 26 extending from its lower surface, and which are staggered in respect to the ridges 25. Valleys 25a and 26a are formed between the ridges, and a web 27 of rubber connects the bases of the ridges. The term "staggered" as used herein means that the bases of the ridges on one side of the web are offset from the bases of the ridges on the opposite side in respect to their altitude, so that the web of rubber connecting the ridges will be flexed and caused to move into the opposite valley when pressure is applied to the top of the ridges. In respect to the ridges 25 and 26, the pressure is applied in the assembled mounting to the top of the ridges by any vibratory movement of the plate 17 towards the top 11a of the base 11. The resilient member 15 has an axially extending portion 28 which is provided with axially extending ridges 29 and valleys 30 on its outer perimeter and similar ridges 31 and valleys 32 on its inner perimeter which are staggered in respect to the ridges 29 and valleys 30.

The resilient vibration damping member 14 is shown in detail in Figs. 5 and 6. It is made in the form of a ring and is provided with radially projecting ridges 33 on its upper side which are staggered in respect to similar ridges 34 formed on its lower side.

In assembling the vibration damping members 14 and 15 in the base 11 between the upper and lower plates 16 and 17, the lower member 15 is assembled so that its axially projecting portion 28 extends through the opening 35 which is surrounded by an upwardly axially extending flange 36 on the top 11a of the base 11. The upper vibration damping member 14 is placed over the axially extending portion 28 of the member 15 and around the flange 36. The members are then secured together by the rivet 18 so that the plates 16 and 17 will be held in constant spaced relation to each other and so that the webs of rubber uniting the bases of the projections 25, 26, and 33, 34 of the resilient members 14 and 15 will not be subjected to any substantial flexure. A free space 37 is provided between the upper plate 16 and the end of the flange 36 to permit downward movement of the plate 16 through the normal range of vibration of the mounting during the flexure of the web, and thereafter permit the rubber to be subjected to compression and thereby cushion the last part of any movement that may be caused by excessive vibrations. The space also extends over the ends of the axial projection 28.

The mounting so assembled and connected to the supported object 13 and the supporting member 12, permits vibratory movement of the supported object 13 in all directions. Axial vibratory movement of the plate 16 towards the top 11a of the base 11 causes the apexes of the ridges 33 and 34 to be displaced in an axial direction, and causes the rubber in the web which connects the ridges on the opposite sides of the damping member 14 to be flexed within the respective opposite valleys 34a and 33a located between the ridges. Axial vibratory movement in the opposite direction cause the ridges 25 and 26 to be displaced in a similar manner by the pressure applied between the plate 17 and the top 11a of the base 11.

Lateral or radial vibratory movements cause the ridges 29 on the outer periphery of the radial projection 28 and the ridges 31 on the inner periphery of the portion 28 to be pressed between the axially extending flange 36 and the hollow rivet 18. Such action causes the web of rubber connecting the ridges on the opposite sides of the portion 28 to be flexed into the valleys 30 and 32.

The flexing movements of the webs of rubber will occur during the normal vibratory range of the mounting. Excessive vibrations cause the rubber in the projecting ridges to be forced into the opposite valleys and such excessive pressure will then subject the rubber body to compressive stresses. It will thus be seen that the normal vibratory movements of the mounting are damped as a result of subjecting the rubber to flexure, and the excessive vibratory movements are damped as a result of subjecting the rubber to compressive stresses.

While the preferred modification of this invention has been described in detail herein, it will be understood that changes may be made therein without departing from the spirit of the invention or the scope of the appended claims, and it is desired to claim the invention as broadly as permitted by the prior art.

Having thus described my invention, what I claim and desire to protect by Letters Patent is:

1. A resilient mounting comprising a soft resilient member having projections on each side thereof, said projections on one side being staggered in respect to said projections on the opposite side, a load supporting plate contacting with the free ends of said projections on one side of said resilient member and a load receiving plate contacting with the free ends of said projections on the other side of said resilient member, said plates being spaced from the bases of said projections on their respective sides and bridging the space between said projections.

2. A resilient mounting comprising a base having an opening therein, soft resilient disc-shaped members on opposite sides of said base, said resilient members having openings therein concentric with said opening in said base, each of said resilient members having projections on opposite sides thereof, said projections on one side of each member being staggered in respect to the projections on its opposite side, plates positioned on opposite sides of said base with said resilient disc-shaped members interposed therebetween, means extending through said opening in said base for connecting said plates together and securing said parts of said mounting on said base, and said plates and said base being in contact with the free ends of the projections on said resilient disc-shaped members and spaced from the bases of said projections.

3. A resilient mounting for supporting one object in respect to another, said mounting comprising a base carried by one object and having an opening therein, rings of soft resilient material connected to the other object and surrounding said opening and clamped to the opposite sides of said base, one of said rings having a series of projections supported by said base and a series of projections on its opposite side staggered in respect to said other projections.

4. A resilient mounting comprising a load receiving base having an opening therein, rings of soft resilient material surrounding said opening on the opposite sides of said base, one of said rings having a series of projecting ridges supported by said base and a series of projecting ridges on its opposite side staggered in respect to said other ridges, and means for clamping said rings against said base.

5. A resilient mounting comprising a load receiving base having an opening therein, a resilient ring extending around said opening on one side of said base, a soft resilient load supporting ring extending around said opening on the opposite side of said base, said load supporting ring having a series of radially extending supporting ridges supported by said base and a series of supporting ridges on its opposite side staggered in respect to the other ridges, a load applying plate carried by said load supporting ring, a plate for supporting said first named resilient ring, and means for clamping said plates together.

6. A resilient mounting comprising a base having an opening therein, an axially projecting annular flange extending around said opening, rings of relatively soft resilient material surrounding said opening on the opposite sides of said base, means for clamping said rings to said base, including opposed plates having openings therein and means extending through said openings and securing said plates together, one of said resilient rings having an axially projecting annular flange extending through said opening in said base and having its outer end spaced from the adjacent plate, the other of said resilient rings being positioned around said annular flange of said opening in said base, and a free space being provided between the end of said base opening flange and the adjacent of said plates.

7. A resilient mounting comprising a base having an opening therein, and rings of resilient material on opposite sides of said base surrounding said opening, means for clamping said rings to said base, including a pair of plates positioned on the opposite sides of said base, said plates having openings therein, a tubular member extending through said openings in said plates and holding said plates together, said opening in said base being surrounded by an axially projecting annular flange extending from said base, one of said rings having an annular flange projecting through said opening, and the other of said resilient rings extending around said flange on said base, and having a greater thickness than the height of said flange on said base, so as to provide a free space between the end of said flange on said base and the adjacent of said plates.

8. A resilient mounting comprising a base having an opening therein, an axially projecting flange extending around said opening, relatively soft resilient rings extending around said opening on the opposite sides of said base, each of said rings having projecting ridges on their opposite sides and the ridges on the opposite sides of each ring being staggered in respect to each other, means for holding said resilient rings against said base, including plates having openings therein and positioned on opposite sides of said base and secured together in constant spaced relation by a clamping member extending through said openings in said plates, one of said rings having an axially projecting annular flange extending through said opening in said base, said annular flange on said ring having projecting ridges on its inner wall which contact with the walls of said flange on said base, the outer wall of said annular flange on said resilient ring having projecting ridges staggered in respect to said ridges on said inner wall, and the other of said resilient rings surrounding said ridges on said annular flange and said flange of said opening in said base.

9. A resilient mounting comprising a base having an opening therein, an axially projecting flange extending around said opening, relatively soft resilient rings extending around said opening on the opposite sides of said base, plates positioned on the opposite sides of said base and having openings therein, means for retaining said resilient rings between said plates and said base, said means including a tubular member extending through said openings in said plates and secured thereto, one of said rings having an axially projecting annular flange extending through said opening in said base, said annular flange on said ring having projecting ridges on its inner and outer walls, said ridges on said inner and outer walls being staggered in respect to each other, and the other of said resilient rings surrounding said annular flanges and having a series of projecting ridges on each side, the ridges on one side being staggered in relation to the ridges on the opposite side.

HESTON H. HILE.